United States Patent [19]

Durbin et al.

[11] Patent Number: 4,568,179

[45] Date of Patent: Feb. 4, 1986

[54] FULL-FRAME ILLUMINATION SYSTEM FOR A DOCUMENT REPRODUCTION DEVICE

[75] Inventors: John A. Durbin, Webster; James D. Rees, Pittsford, both of N.Y.

[73] Assignee: Xerox Corporation, Stamford, Conn.

[21] Appl. No.: 637,655

[22] Filed: Aug. 3, 1984

[51] Int. Cl.⁴ .............................................. G03B 27/54
[52] U.S. Cl. ...................................... 355/67; 362/346; 362/343
[58] Field of Search ....................... 355/67, 69, 70, 82, 355/23, 24, 25, 18, 71; 362/297, 310, 343, 346

[56] References Cited

U.S. PATENT DOCUMENTS

| | | | |
|---|---|---|---|
| 3,132,810 | 5/1964 | Ostensen | 355/82 |
| 3,192,842 | 7/1965 | Heiss | 355/82 |
| 3,635,557 | 1/1972 | Alderton | 355/82 X |
| 3,697,177 | 10/1972 | Booth | 355/67 |
| 3,912,510 | 10/1975 | Marks | 96/1 R |
| 4,333,723 | 6/1982 | Green et al. | 355/71 |

Primary Examiner—L. T. Hix
Assistant Examiner—Brian W. Brown

[57] ABSTRACT

A two-dimensional full-frame illumination assembly is formed, in a preferred embodiment, by coupling light into the edges of a document platen which has been modified by applying a white segment pattern to the bottom platen surface. The coupled light is totally internally reflected within the platen body except for the area covered by the segment pattern. Light encountering the segments is reflected upward towards the document support surface to provide the required document illumination. The light reflected by the document passes back through the screen segment pattern and is projected by a conventional lens or a full-frame, two-dimensional, short focal length lens array onto a photosensitive surface such as a photoreceptor belt.

7 Claims, 3 Drawing Figures

FULL-FRAME ILLUMINATION SYSTEM FOR A DOCUMENT REPRODUCTION DEVICE

The present invention relates generally to an illumination system for a document reproduction device and, more particularly, to an illumination assembly which includes a platen modified to function both as a document support and as a secondary document illumination source.

Prior art full frame document illumination and imaging systems generally employ a flash lamp or series of lamps combined with a conventional projection lens to provide full-frame exposure of a document at a photosensitive image plane. Representative systems are disclosed in U.S. Pat. No. 3,697,177 (Booth) and U.S. Pat. No. 4,333,723 (Green et al). These prior art systems offer relatively high throughput compared to the conventional scan/rescan systems but the flash lamps and related power sources are relatively expensive. These full-frame flash systems also require sizeable housing units (integrating cavities) with reflective interior walls to efficiently direct the illumination to the document/platen interface.

It is therefore an object of the present invention to provide a fullframe illumination system less expensive and more compact than the prior art devices. It is a further object of the invention to obtain a uniform level of illumination at a document support interface without the use of an integrating cavity housing. These, and other objects, are realized by modifying a transparent document platen so that light introduced into the platen from an external source is directed to the document/platen interface to provide a uniform level of illumination. More particularly, the invention is directed towards an imaging system for transmitting an image of a document at an object plane onto a photosensitive image plane, including platen means for supporting and illuminating said document in said object plane, said means comprising:

an imaging system for transmitting an image of a document at an object plane onto a photosensitive image plane, including a platen means for supporting and illuminating said document in said object plane, said platen means comprising:

a generally transparent platen member, said member having a top surface for supporting said document and a bottom surface, said bottom surface having a plurality of light-reflecting irregularities formed thereon, means for coupling illumination into at least one side of said platen member, said illumination propagating along a totally internally reflected path, said path altered only when said illumination encounters said bottom surface irregularities whereby light is reflected upward towards said document support surface to provide illumination of said document, and means for projecting light reflected from said document to said photosensitive image plane.

DRAWINGS

DESCRIPTION

Figure 1:
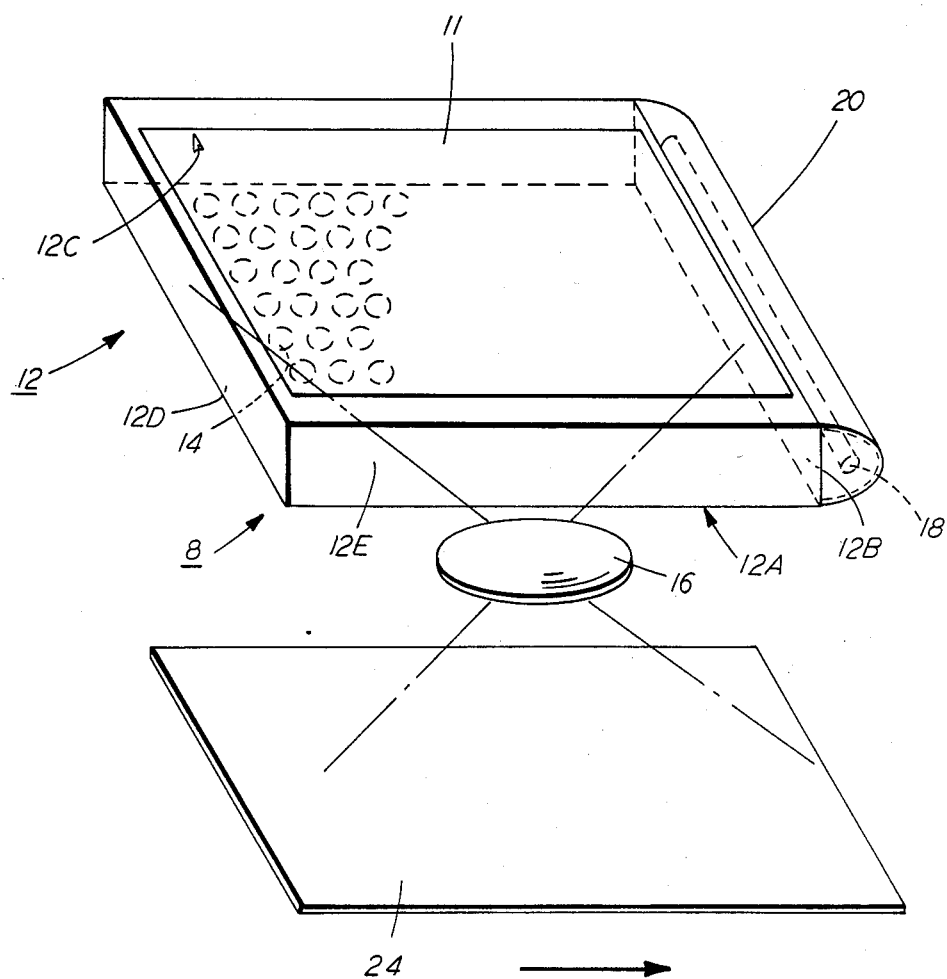
FIG. 1 is a top perspective view of a document imaging system using a platen/illumination assembly according to the principles of the present invention.
Figure 2:
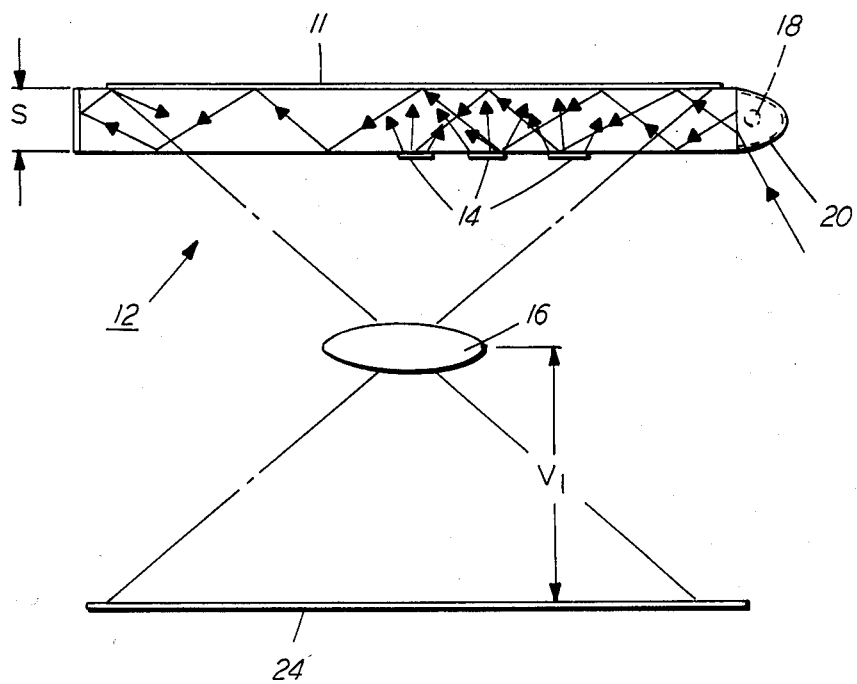
FIG. 2 is a side view of the system of FIG. 1.

Referring now to FIG. 1, there is shown a first embodiment of an imaging system 8 using the illuminator of the present invention. As shown, a document 11 is placed on the top surface of a platen 12 which is optically transmissive to light passing therethrough save for a plurality of opaque white segments 14 formed in intimate contact with the surface 12A of the platen surface nearest projection lens 16. The opaque segments, in this embodiment, are circular, although only a portion of the segments are shown in FIGS. 1 and 2. It is understood that a segment pattern would be formed over the entire platen surface with the total pattern area consistent with the document sizes to be reproduced. A linear flash lamp 18 is completely enclosed in the space formed between the side of platen 12 and reflector 20 can be diffuse or specular. A power supply (not shown) provides power to lamp 18.

In operation, lamp 18 is triggered into operation and provided with the appropriate input from the power supply. The light flash, comprising a direct component from the lamp and a reflected component from reflector 20, enters the body of platen 12 via entrance face 12B (which is perpendicular to top and bottom surfaces of the platen). Except for reflector and lamp absorption losses, all the light from the lamp will be coupled into the platen. The coupled illumination undergoes total internal reflections (TIR) from the top and bottom surfaces of the platen. This occurs when the angle of incidence of light range proceeding from a more dense to a less dense medium is equal to or greater than a critical angle Ic. Ic is given by the expression $Ic = \arcsin n/n'$ where $n'$ is the index of refraction of the denser medium (platen 12) and $n$ is the index of refraction of the less dense medium; e.g. air. Thus by appropriate selection of the index of the platen (greater than 1.414 for the present example of air as the less dense medium), all the light rays enter and undergo TIR. Of importance for the operation of the platen as an illumination source is that only a small percentage of the light introduced into the platen will escape except for that light which encounters any of the segments 14.

Of particular importance for the enabling of the present invention is the realization by the Applicants, that the TIR could be modified, or "frustrated" by placing a series of opaque white segments along the TIR path. The size, shape and spacing of the segments is analytically determined, as disclosed in detail below, but it is sufficient to state at this point that the TIR light, upon encountering a white segment is diffusely reflected upwards, as shown in FIG. 2. Each segment, in effect, becomes a secondary light source. The light from lamp 18 is thus effectively, and efficiently coupled into the platen and reflected upward to form a uniform level of illumination at the top surface (document interface) of the platen. The light reflected from the document, passes through the screen pattern formed by segments 14 and is then projected by wide angle lens 16 onto photoreceptor belt 24. Belt 24 is moved by means not shown but well-known to those skilled in the art, through an exposure zone.

For the FIG. 1 embodiment, greater efficiency is obtained by coating platen edges 12c, 12d and 12e with a specular reflecting material. The light loss, other than the imaging component, from platen 12 will thus be minimal.

EXAMPLES

A grid pattern of 2.8 white dots/mm, (dot frequency) each dot approximately 0.178 mm diameter and separated by a 0.178 mm spacing distance was formed on the bottom surface of an optically transparent support made of low absorption glass and having dimensions of 9"×14"×6 mm. A xenon flash lamp supplies sufficient energy into the side of the support member. Each dot was formed by applying a white highly reflective paint, using a silk screen process, to the bottom surface of the platen. Dot reflectivity was 90%. One method for calculating a dot diameter, d is given by the expression $$d = s/(V_1/D) \tag{1}$$

(see FIG. 2) where s is the dot screen to document distance, $V_1$ is the lens-to-image plane distance, and D is the lens 16 diameter. For this example $V_1 = 9$ mm; $D = 0.400$ mm and $s - 6$ mm. Solving for d in equation (1) gives $d = 0.178$ mm which, in turn, provides a 50% dot screen pattern of 2.8 dots/mm.

Figure 3:
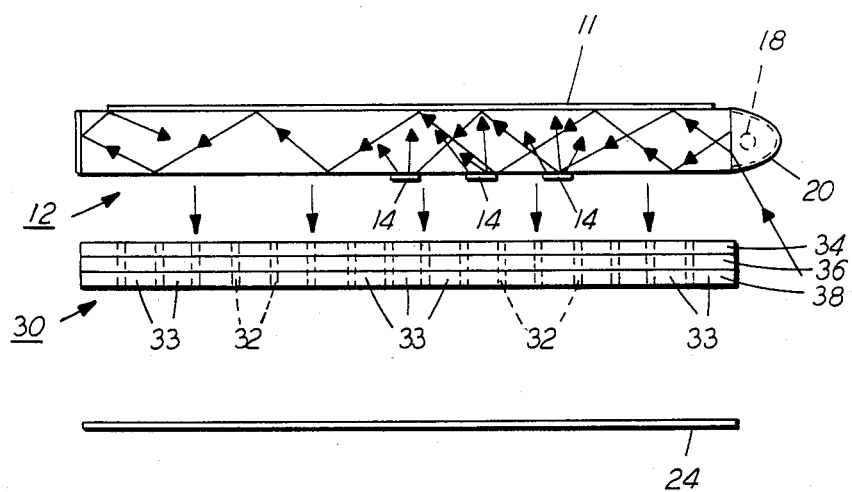
FIG. 3 is a side view of the platen/illumination assembly used in conjunction with a full-frame two-dimensional short conjugate projection lens.

FIG. 3 shows an alternate imaging system utilizing the modified platen of the present invention. In this embodiment, a two-dimensional short focal length lens array 30 is positioned beneath platen 12 to form a compact strip lens imaging configuration comprising a plurality of microlenses 32, separated by opaque insulating segments 33. The array is formed by stacking substrates 34, 36, 38 so that each lens element is coaxial along the optical path with the lens elements of the other substrates. At a 1:1 magnification, the position of the document within the field of view of adjacent lenslets are superimposed on one another to form a uniform continuous image at photosensitive image plane 24. An exemplary lens array 30 is disclosed in a paper presented July 4, 1983 at the 4th Optical Meeting on "Gradient Index Optical Imaging Systems". The paper is printed on pages 224–227 of the "Technical Digest" of that conference and the contents of the paper are hereby incorporated by reference. It may be noted that this microlens configuration does not disclose any illumination source to be used with this type of array. The present invention effectually enables use of a short conjugate, full-frame lens array with the attendant advantages of providing a compact imaging system.

It is understood that further variations may be introduced into the FIG. 1 or 3 embodiments without departing from the principles of the invention. For example, while opaque segments of varying size, density and shape may be formed along the bottom surface of the platen, the purpose is to form irregularities or obstructions to the impinging TIR light which create diffuse reflection of the light. The same purpose can be accomplished by etching the bottom surface at a number of discrete points. Each etched area, thus constitutes an irregularity or obstruction to the TIR light and functions in the same manner as the coated segments of the FIG. 1 embodiment. As another example, additional, non-linear light sources could be used to introduce light into one or more of the platen edges. Also, the segment, or etching pattern may be made partially transmissive in order to enable an additive screen function. And while a gradient index microlens array is disclosed as a full frame, short focal length lens array, other two-dimensional arrays such as a gradient index optical fiber lens array, or a thick lens array may be used.

What is claimed is:

1. An imaging system for transmitting an image of a document at an object plane onto a photosensitive image plane, including a platen means for supporting and illuminating said document in said object plane, said platen means comprising:

a generally transparent platen member, said member having a top surface for supporting said document, and a bottom surface, said bottom surface comprising discrete light-reflecting segments and light transmissive segments, means for coupling illumination into at least one side of said platen member, said illumination propagating along a totally internally reflected path, said path altered when said illumination encounters said discrete light-reflecting segments whereby light is reflected upward from said segments towards said document support surface to provide illumination of said document, and means for projecting light reflected from said document and passing through said transmissive segments to said photosensitive image plane.

2. The imaging system of claim 1 wherein said side of said platen member is perpendicular to said top and bottom surfaces.

3. The imaging system of claim 1 wherein the sides of said platen member excepting for the portion where the illumination is introduced, are reflective.

4. The imaging system of claim 1 wherein a plurality of illumination sources introduce light into said platen member.

5. The imaging system of claim 1 wherein said light projection means is a 2-dimensional, full-frame lens array.

6. The imaging system of claim 1 wherein said light reflecting segments are partially transmissive.

7. The imaging system of claim 1 where said discrete light-reflecting segments comprise an opaque white dotted pattern.

* * * * *